United States Patent
Appiah et al.

(10) Patent No.: US 8,850,041 B2
(45) Date of Patent: Sep. 30, 2014

(54) ROLE BASED DELEGATED ADMINISTRATION MODEL

(75) Inventors: Madan Appiah, Redmond, WA (US); Malcolm Erik Pearson, Kirkland, WA (US); Daniel Kershaw, Mercer Island, WA (US)

(73) Assignee: Microsoft Corporation, Redmond, WA (US)

(*) Notice: Subject to any disclaimer, the term of this patent is extended or adjusted under 35 U.S.C. 154(b) by 1002 days.

(21) Appl. No.: 12/472,129

(22) Filed: May 26, 2009

(65) Prior Publication Data
US 2010/0306775 A1    Dec. 2, 2010

(51) Int. Cl.
G06F 15/16    (2006.01)
G06F 9/46    (2006.01)

(52) U.S. Cl.
CPC ........................ *G06F 9/468* (2013.01)
USPC ........................................ 709/229

(58) Field of Classification Search
CPC ................... G06F 21/6218; G06F 2221/2141
USPC ........................................ 709/229
See application file for complete search history.

(56) References Cited

U.S. PATENT DOCUMENTS

| | | | |
|---|---|---|---|
| 6,182,142 B1* | 1/2001 | Win et al. | 709/229 |
| 6,453,353 B1* | 9/2002 | Win et al. | 709/229 |
| 6,792,462 B2* | 9/2004 | Bernhardt et al. | 709/225 |
| 7,080,077 B2* | 7/2006 | Ramamurthy et al. | 707/754 |
| 7,085,834 B2* | 8/2006 | Delany et al. | 709/225 |
| 7,185,364 B2* | 2/2007 | Knouse et al. | 726/8 |
| 7,206,851 B2* | 4/2007 | Delaney et al. | 709/229 |
| 7,464,162 B2* | 12/2008 | Chan | 709/225 |
| 7,475,151 B2* | 1/2009 | Delany et al. | 709/229 |
| 7,730,523 B1* | 6/2010 | Masurkar | 726/4 |
| 2001/0037395 A1* | 11/2001 | Sabat et al. | 709/229 |
| 2002/0065864 A1* | 5/2002 | Hartsell et al. | 709/100 |
| 2002/0133579 A1* | 9/2002 | Bernhardt et al. | 709/223 |
| 2002/0174365 A1* | 11/2002 | Antonov et al. | 713/201 |
| 2002/0184391 A1* | 12/2002 | Phillips | 709/248 |
| 2005/0050226 A1* | 3/2005 | Larson | 709/245 |
| 2005/0165956 A1* | 7/2005 | Lee | 709/238 |
| 2006/0026229 A1* | 2/2006 | Ari et al. | 709/203 |
| 2006/0206593 A1* | 9/2006 | Lingafelt et al. | 709/220 |
| 2007/0067437 A1* | 3/2007 | Sindambiwe | 709/224 |

(Continued)

OTHER PUBLICATIONS

U.S. Appl. No. 12/472,120, Apr. 4, 2011, Office Action.

(Continued)

*Primary Examiner* — Rupal Dharia
*Assistant Examiner* — Marcus McKenzie
(74) *Attorney, Agent, or Firm* — Ben Tabor; David Andrews; Micky Minhas (57) ABSTRACT

Embodiments disclosed herein extend to the use of administrative roles in a multi-tenant environment. The administrative roles define administrative tasks defining privileged operations that may be performed on the resources or data of a particular tenant. In some embodiments, the administrative tasks are a subset of administrative tasks. The administrative role also defines target objects which may be subjected to the administrative tasks. In some embodiments, the target objects are a subset of target objects. An administrator may associate a user or group of users of the particular tenant with a given administrative role. In this way, the user or group of users are delegated permission to perform the subset of administrative tasks on the subset of target objects without having to be given permission to perform all administrative tasks on all target objects.

20 Claims, 9 Drawing Sheets

(56) References Cited

U.S. PATENT DOCUMENTS

| | | |
|---|---|---|
| 2007/0088741 A1* | 4/2007 | Brooks et al. ............ 707/103 R |
| 2008/0082540 A1* | 4/2008 | Weissman et al. ............... 707/9 |
| 2008/0086735 A1* | 4/2008 | Cheenath et al. ............ 719/313 |
| 2008/0184336 A1* | 7/2008 | Sarukkai et al. .................. 726/1 |
| 2008/0256250 A1* | 10/2008 | Wakefield .................... 709/229 |
| 2009/0037492 A1* | 2/2009 | Baitalmal et al. ............. 707/201 |
| 2009/0049422 A1* | 2/2009 | Hage et al. ................... 717/104 |
| 2009/0089625 A1* | 4/2009 | Kannappan et al. ............. 714/39 |
| 2009/0144802 A1* | 6/2009 | Tillery et al. ..................... 726/1 |
| 2010/0125612 A1* | 5/2010 | Amradkar et al. ............ 707/802 |
| 2010/0205243 A1* | 8/2010 | Brady .......................... 709/203 |
| 2010/0306393 A1 | 12/2010 | Appiah |

OTHER PUBLICATIONS

U.S. Appl. No. 12/472,120, filed Sep. 13, 2011, Office Action.
Notice of Allowance dated May 12, 2014 cited in U.S. Appl. No. 12/472,120.

* cited by examiner

| Roles → / Tasks ↓ | Company Admin Role | Licence Admin Role | Service Admin Role | User Admin Role | Helpdesk Admin Role | User Role (limited) |
|---|---|---|---|---|---|---|
| Add Domain | ✓ | | | | | |
| Delete Domain | ✓ | | | | | |
| Assign Role (delegate) | ✓ | | | | | |
| Unassign Role | ✓ | | | | | |
| Assign Licenses | ✓ | ✓ | | | | |
| Remove Licence | ✓ | ✓ | | | | |
| Add User | ✓ | ✓ | | ✓ | | |
| Delete User | ✓ | ✓ | | ✓ | | |
| Manage Services | ✓ | | ✓ | | | |
| Read Users List | ✓ | ✓ | ✓ | ✓ | ✓ | ✓ |
| Modify User Info | ✓ | ✓ | | ✓ | | ✓ |
| Reset Passwords | ✓ | ✓ | | ✓ | ✓ | |
| Read Licence Assignment | ✓ | ✓ | ✓ | ✓ | ✓ | |
| Create Help Ticket | ✓ | ✓ | ✓ | ✓ | ✓ | |
| Read Help Ticket | ✓ | ✓ | ✓ | ✓ | ✓ | ✓ |
| Modify Help Ticket | ✓ | ✓ | ✓ | ✓ | ✓ | |
| Delete Help Ticket | ✓ | ✓ | ✓ | ✓ | ✓ | |
| Monitor Service Status | ✓ | ✓ | ✓ | ✓ | ✓ | ✓ |

FIG. 4

```xml
<?xml version="1.0" encoding="utf-8"?>
<r:OnlineRoles xmlns:r="http://schemas.microsoft.com/Online/Roles" version="1.0">
  <r:role name="Company Admin Role">
    <r:task name="Add Domain" />
    <r:task name="Delete Domain" />
    <r:task name="Assign Role" />
    <r:task name="Unassign Role" />
    <r:task name="Assign Licenses" />
    <r:task name="Remove License" />
    <r:task name="Add User" />
    <r:task name="Delete User" />
    <r:task name="Manage Services" />
    <r:task name="Read Users List" />
    <r:task name="Modify User Info" />
    <r:task name="Reset Passwords" />
    <r:task name="Read License Assignment" />
    <r:task name="Create Help Ticket" />
    <r:task name="Read Help Ticket" />
    <r:task name="Modify Help ticket" />
    <r:task name="Delete Help Ticket" />
    <r:task name="Monitor service Status" />
    <r:scope name="Group Scope">
      <r:group name="Tenant">
        Entire Tenant
      </r:group>
    </r:scope>
  </r:role>
  <r:role name="Helpdesk Admin Role">
    <r:task name="Read Users List" />
    <r:task name="Modify User Info" />
    <r:task name="Reset Passwords" />
    <r:task name="Read License Assignment" />
    <r:task name="Create Help Ticket" />
    <r:task name="Read Help Ticket" />
    <r:task name="Modify Help ticket" />
    <r:task name="Delete Help Ticket" />
    <r:task name="Monitor service Status" />
    <r:scope name="Group Scope">
      <r:group name="Tenant">
        Entire Tenant
      </r:group>
    </r:scope>
  </r:role>
  <r:role name="User Role">
    <r:task name="Read Users List" />
    <r:task name="Modify User Info" />
    <r:task name="Read Help Ticket" />
    <r:scope name="User Scope">
      <r:User name="Self">
        Self User
      </r:User>
    </r:scope>
  </r:role>
</r:OnlineRoles>
```

ROLE BASED DELEGATED ADMINISTRATION MODEL

BACKGROUND

Computing technology has contributed enormously to the advancement of humankind. Computing systems come in a wide variety of physical forms including desktop computers, laptop computers, personal digital assistants, telephones, and even devices that have not been conventionally thought of as computing systems such as, for example, refrigerators and automobiles. Thus, a computing system may be any device or system that has a processor and a memory of any type.

One type of computing system is a multi-tenant system. A multi-tenant system includes multiple tenants that share resources at a management console. Each tenant typically includes an administrator that has permission to perform administrative tasks on the resources and data of the tenant. For example, the administrator may change the password of a tenant user or may add a new tenant user.

Currently, however, there is no way for the administrator to delegate a subset of the administrative tasks to another user of the tenant. Instead, the administrator typically assigns full administrative rights to the other user. In addition, the scope of administration today typically spans the entire tenant. In other words, when an administrative task is performed, it is usually performed on all target objects associated with the tenant. Accordingly, there is also currently no way for the administrator to limit which target objects the other tenant user may perform administrative tasks on.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are directed towards defining administrative roles in a multi-tenant environment. The administrative roles allow a tenant administrator to delegate a subset of administrative tasks to other tenant users and allow the user to gain permission to perform the administrative tasks. In one embodiment, various administrative tasks and various administrative roles are defined at a management console. A set of administrative tasks are then assigned at the management console to each of the administrative roles, where the set of administrative tasks is different for each administrative role. One or more target objects that may be subjected to the administrative tasks are then identified for each given administrative role.

In another embodiment, a user request for access to perform administrative tasks is received and an identity of the user is determined. The user is mapped to an administrative role that defines a set of administrative tasks that the user is allowed to perform and a set of target objects on which the set of administrative tasks may be performed. It may then be determined if the administrative tasks the user desires to perform are permitted by the administrative role and if the desired target objects are permitted by the administrative role.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments described herein, the drawings illustrated specific embodiments. It is appreciated that these drawings depict only illustrated embodiments of the invention and are therefore not to be considered limiting of its scope. The embodiments will be described and explained with additional specificity and detail through the use of the accompanying drawings in which:

FIG. 5 illustrates an XML schema that may be used to define administrative roles in accordance with embodiments disclosed herein;

DETAILED DESCRIPTION

Embodiments disclosed herein extend to the use of administrative roles in a multi-tenant environment. The administrative roles define administrative tasks defining privileged operations that may be performed on the resources or data of a particular tenant. In some embodiments, the administrative tasks are a subset of administrative tasks. The administrative role also defines target objects which may be subjected to the administrative tasks. In some embodiments, the target objects are a subset of target objects. An administrator may associate a user or group of users of the particular tenant with a given administrative role. In this way, the user or group of users are delegated permission to perform the subset of administrative tasks on the subset of target objects without having to be given permission to perform all administrative tasks on all target objects.

First, an example computing system will be described in which the principles of the present invention may be used with respect to FIG. 1. Then, the principles of the present invention will be described in further detail with respect to the subsequent Figures.

Embodiments described herein may comprise or utilize a special purpose or general-purpose computer including computer hardware, as discussed in greater detail below. Embodiments also include physical computer-readable media for carrying or storing computer-executable instructions and/or data structures. Such computer-readable media can be any available physical media that can be accessed by a general purpose or special purpose computer system. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above Rather, the described features and acts are disclosed as example forms of implementing the claims.

Those skilled in the art will appreciate that the embodiments described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
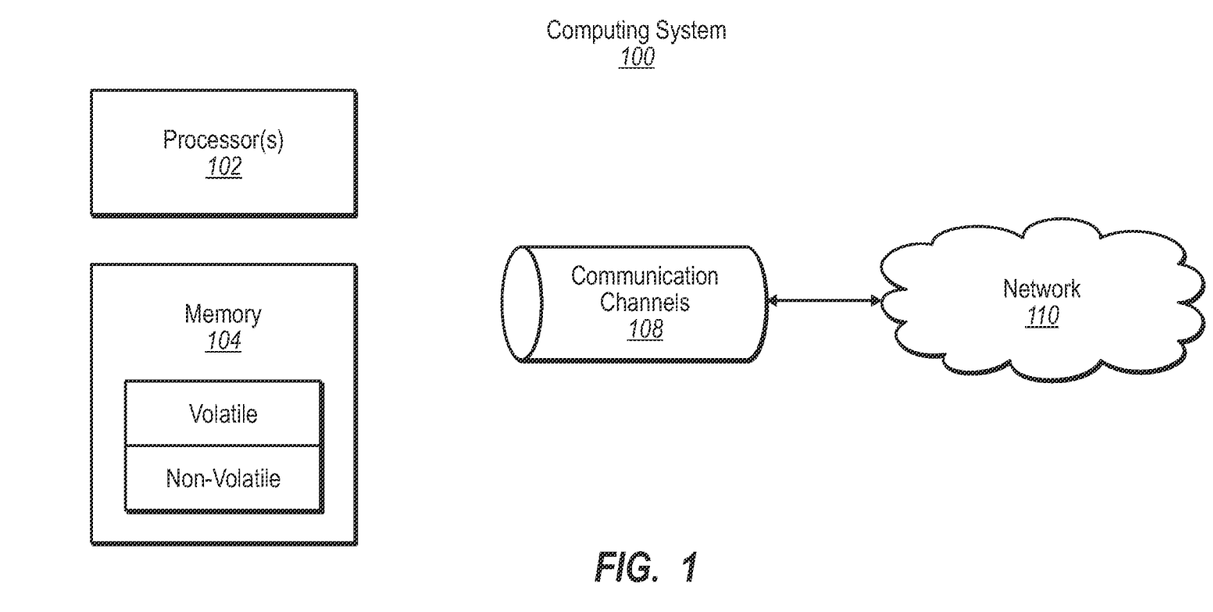
FIG. 1 illustrates a computing system in which the embodiments disclosed herein may operate.

FIG. 1 shows a schematic diagram of an example computing system 100 that may be used to implement features described herein. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Referring to FIG. 1, in its most basic configuration, a computing system 100 typically includes at least one processing unit 102 and memory 104. The memory 104 may be system memory, which may be volatile, non-volatile, or some combination of the two. An example of volatile memory includes Random Access Memory (RAM) Examples of non-volatile memory include Read Only Memory (ROM), flash memory, or the like. The term "memory" may also be used herein to refer to non-volatile mass storage such as physical storage media. Such storage may be removable or non-removeable, and may include (but is not limited to) PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other computing systems over, for example, network 110.

Figure 2:
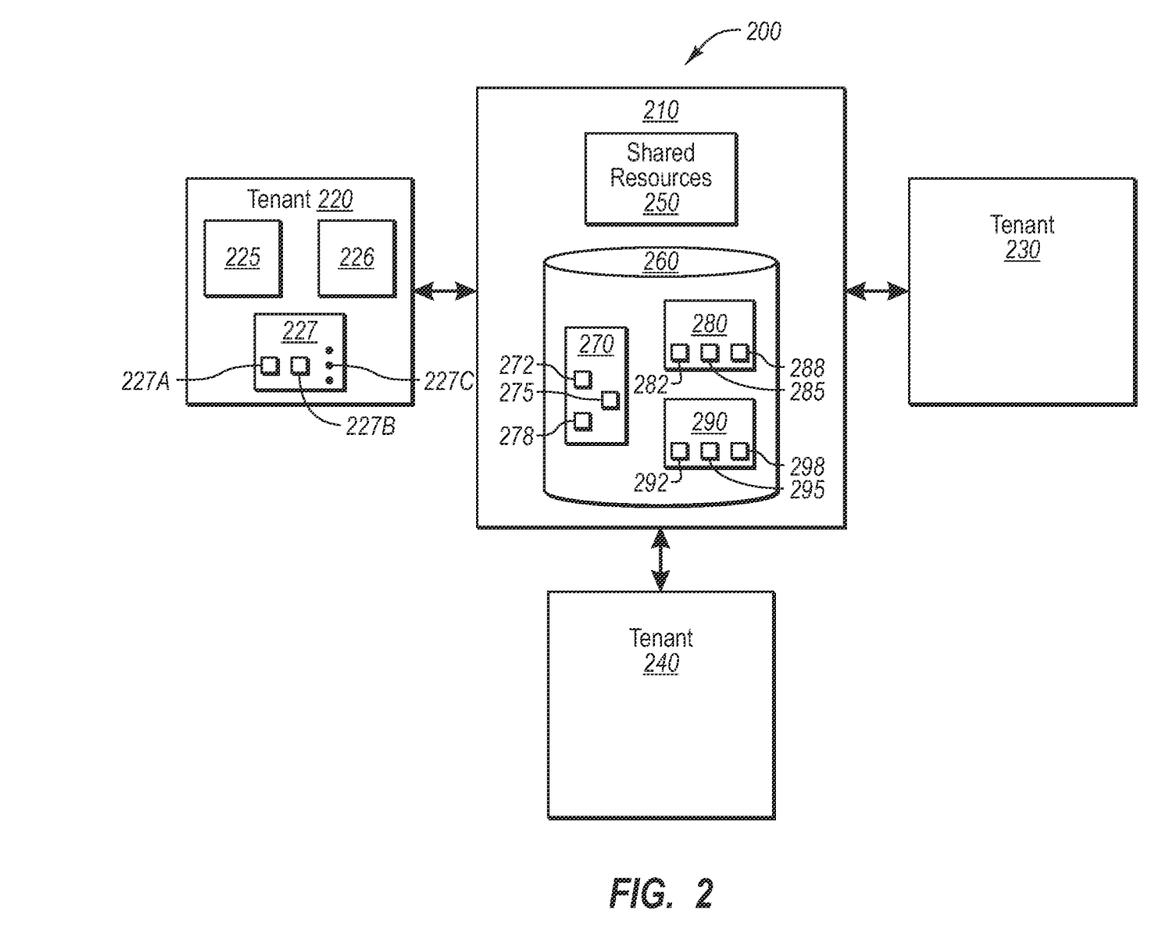
FIG. 2 illustrate a multi-tenant computing system in which the embodiments disclosed herein may be performed.

Attention is now made to FIG. 2, which illustrates a multi-tenant computing system 200. As illustrated, the computing system 200 includes a management console or service center 210, which may correspond to computing system 100, although this is not required. The computing system 200 also includes various tenants 220, 230, and 240. A tenant is a company, organization, other group of users, or a single user who access and use the services and resources that are resident on management console 210. As will be appreciated, although three tenants are illustrated, any number of additional tenants may also access management console 210 as circumstances warrant.

Referring to FIG. 2, the management console 210 hosts shared resources 250. The shared resources 250 may be software that the various tenants use in their business endeavors. For example, the shared resources may include email, communication, meeting, customer management, and collaboration software. The shared resources may include numerous other types of software and other services as circumstances warrant. In operation, the users of a tenant such as tenant 220 access the shared resources 250 to perform various operations. For example, the users of tenant 220 may access the email software to send email or may access the collaboration software for collaborative tasks. Likewise, the users of tenants 230 and 240 may also access the shared resources 250 as needed.

As further shown in FIG. 2, the management console 210 also includes a storage component 260. The storage component 260 is configured to allow each tenant to store data and other resources that are unique to that tenant. For example, the tenant 220 may have access to a memory portion 270 for storing unique data and other resources unique to tenant 220, the tenant 230 may have access a memory portion 280 for storing the unique data and other resources unique to tenant 230, and the tenant 240 may have access a memory portion 290 for storing the unique data and other resources unique to tenant 240.

The memory portion 270 may include data 272 and resources 275. The data 272 may include data that is manipulated by the shared resources 250. The resources may include various resources unique to tenant 220. As will be appreciated, the memory portion 270 is structured to be a secure storage component that can only be accessed by the users of tenant 220. That is, although the users of tenants 230 and 240 may also have access to storage component 260, these users will not be able to access the data 272 and resources 275. Thus, the data and resources of tenant 220 are protected from outside users.

The storage portion 270 may also include administrative resources 278. The administrative resources 278 provide administrative control to an administrator 225 of tenant 220. The administrative resources 278 will be described in more detail to follow.

As also illustrated, the storage portion 280 may also include data 282, resources 285, and administrative resources 288. Likewise, storage portion 290 may also include data 292, resources 295, and administrative resources 298.

Particular attention is now made to tenant 220. As shown, tenant 220 includes various users who may access the resources and data hosted on management console 210. The various users may access the management console either from a physical location of the tenant 220 or from some location that is remote to tenant 220.

As previously mentioned, the tenant 220 includes an administrator 225 who performs administrative tasks for the tenant 220. These administrative tasks will be described in more detail to follow. In addition, the tenant 220 may include a user 226 who is an individual associated with the tenant 220 who accesses the management console 210. Tenant 220 may also include a group of users 227, comprised of users 227A, 227B, and potentially any number of additional users as represented by ellipses 227C, In some embodiments, the group 227 may be a department of the tenant 220. Although not illustrated, tenants 230 and 240 may also include various users corresponding to the users of tenant 220.

There may be circumstances when it would be beneficial for the administrator 225 to delegate one or more administrative tasks to the other users of tenant 220 without having to delegate the entire set of administrative tasks. In addition, it may be advantageous to limit the objects on which administrative tasks may be performed when the tasks are delegated. Advantageously, the embodiments disclosed herein provide a mechanism for the administrator 225 to delegate administrative tasks to other users of the tenant.

Figure 3:
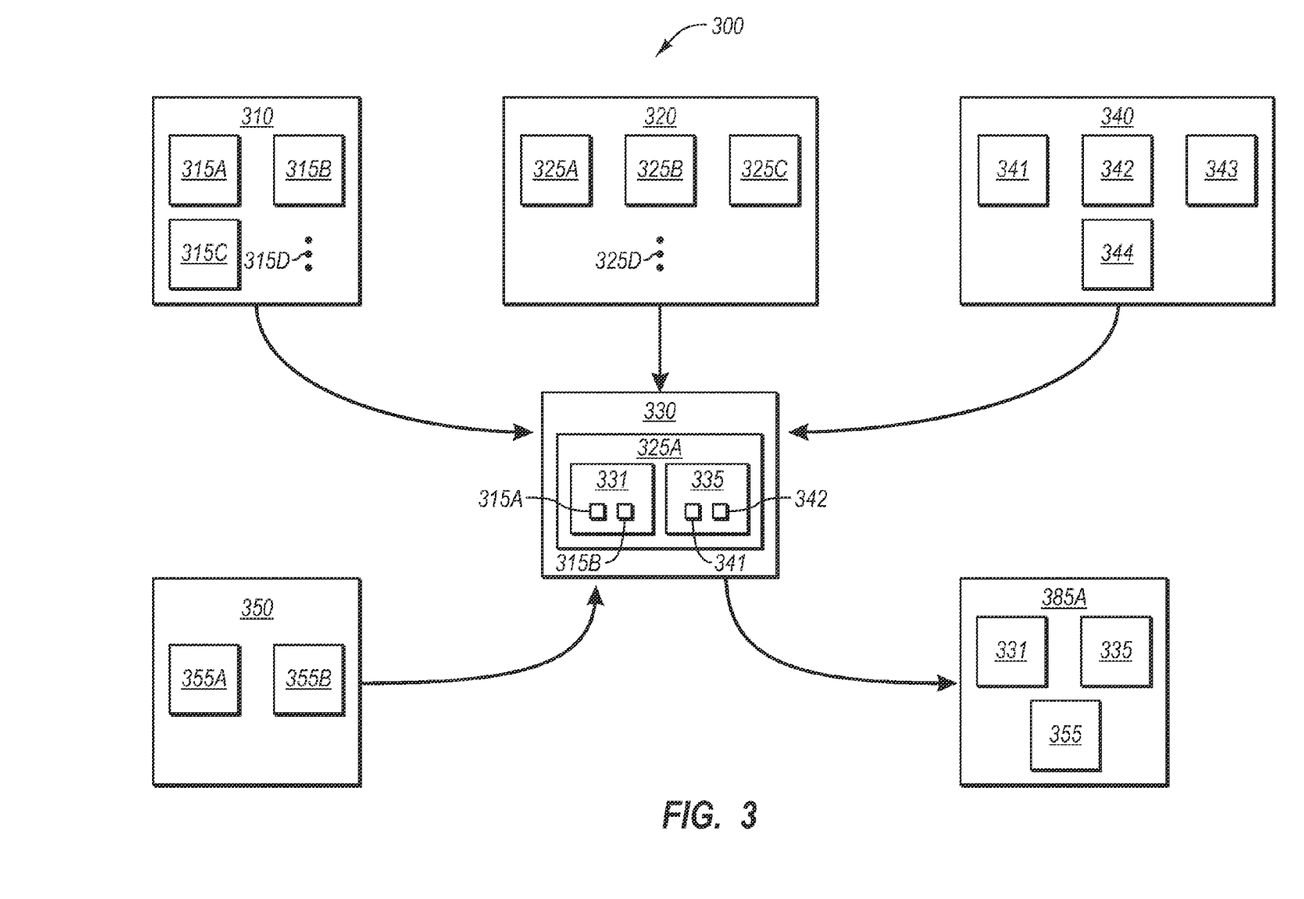
FIG. 3 illustrates a portion of the multi-tenant computing system of FIG. 2 in which the embodiments disclosed herein may be performed.

Attention is now made to FIG. 3, which illustrates a system 300 of the management console 210 that is configured to allow a tenant administrator or a system designer to define administrative tasks and roles that may be delegated to other users of a tenant. The system 300 may correspond to the administrative resources 278 previously described, although this is not required. It will be appreciated that although the system 300 is shown as comprising various modules, in some embodiments there may be more or less than the illustrated modules. In addition, although the modules are shown as being separate modules, in some embodiments the illustrated modules may be combined or may be part of another module.

Further, the various modules of system may include software, hardware, or any combination of software and hardware as circumstances warrant.

The system 300 includes a task module 310 that is configured to allow for the definition of various administrative tasks that may be performed on the data and resources of a tenant. Typically, the administrative tasks are privileged operations that may be performed on the data and resources of a tenant and that only an administrator or someone authorized by the administrator can perform.

As shown, numerous administrative tasks (herein after also referred to simply as administrative tasks 315) 315a, 315b, 315c, and potentially any number of additional administrative tasks as illustrated by the ellipses 315d may be defined. Examples of administrative tasks include, but are not limited, to add domain, delete domain, assign role, unassigned role, assign license, remove license, add user, delete user, manage services, read users list, modify user information, reset password, read license agreement, create help ticket, read help ticket, modify help ticket, delete help ticket, and monitor service status.

In some embodiments, the administrative tasks 315 are defined by a designer of system 300 and the administrator 225 simply identifies desired preexisting administrative tasks. In other embodiments, the administrator 225 may define the administrative tasks. Additionally, in further embodiments the administrator 225 may modify the administrative tasks 315 by adding or deleting administrative tasks.

The system 300 also includes a role module 320 that is configured to define various administrative roles. An administrative role designates various administrative functions that may be performed and are configured to have one or more of the administrative tasks 315 that are appropriate to the role assigned or mapped to them as will be explained.

As shown, numerous administrative roles (herein after also referred to simply as administrative roles 325) 325a, 325b, 325c, and potentially any number of additional administrative roles as illustrated by the ellipses 325d may be defined, Examples of administrative roles include, but are not limited to company administrative role, license administrative role, service administrative role, helpdesk administrative role, user role, and user administrative role.

In some embodiments, the administrative roles 325 are defined by a designer of system 300 and the administrator 225 simply identifies the preexisting administrative roles. In other embodiments, the administrator 225 may define the administrative roles. Additionally, in further embodiments the administrator 225 may modify the administrative roles as will be described in more detail to follow.

The system 300 may also include an assign or mapping module 330. In operation, the assign or mapping module 330 receives a designated administrative role 325. The mapping module 330 is then configured to access a set of the administrative tasks 315 that are appropriate for the administrative role 325. For example, if the administrative role 325 was the helpdesk administrative role, then the assign or mapping module 330 would assign those administrative tasks 315 that are appropriate for the helpdesk administrative role.

As shown in FIG. 3, the administrative role 325a has been assigned at set of administrative tasks 331, which includes administrative tasks 315a and 315b. Thus, the set of administrative tasks 331 will typically include a subset of the administrative tasks 315, although in some instances an administrative role may have the all the administrative tasks 315 assigned to it. In addition, each administrative role 325 will typically have a different set 331 of administrative tasks as some administrative tasks 315 may be appropriate for one administrative role 325 while not being appropriate for another administrative role. It will be appreciated, however, that a given administrative task 315 may be assigned to more than one administrative role 325 if the administrative task is appropriate for more than one administrative role.

Figure 4:
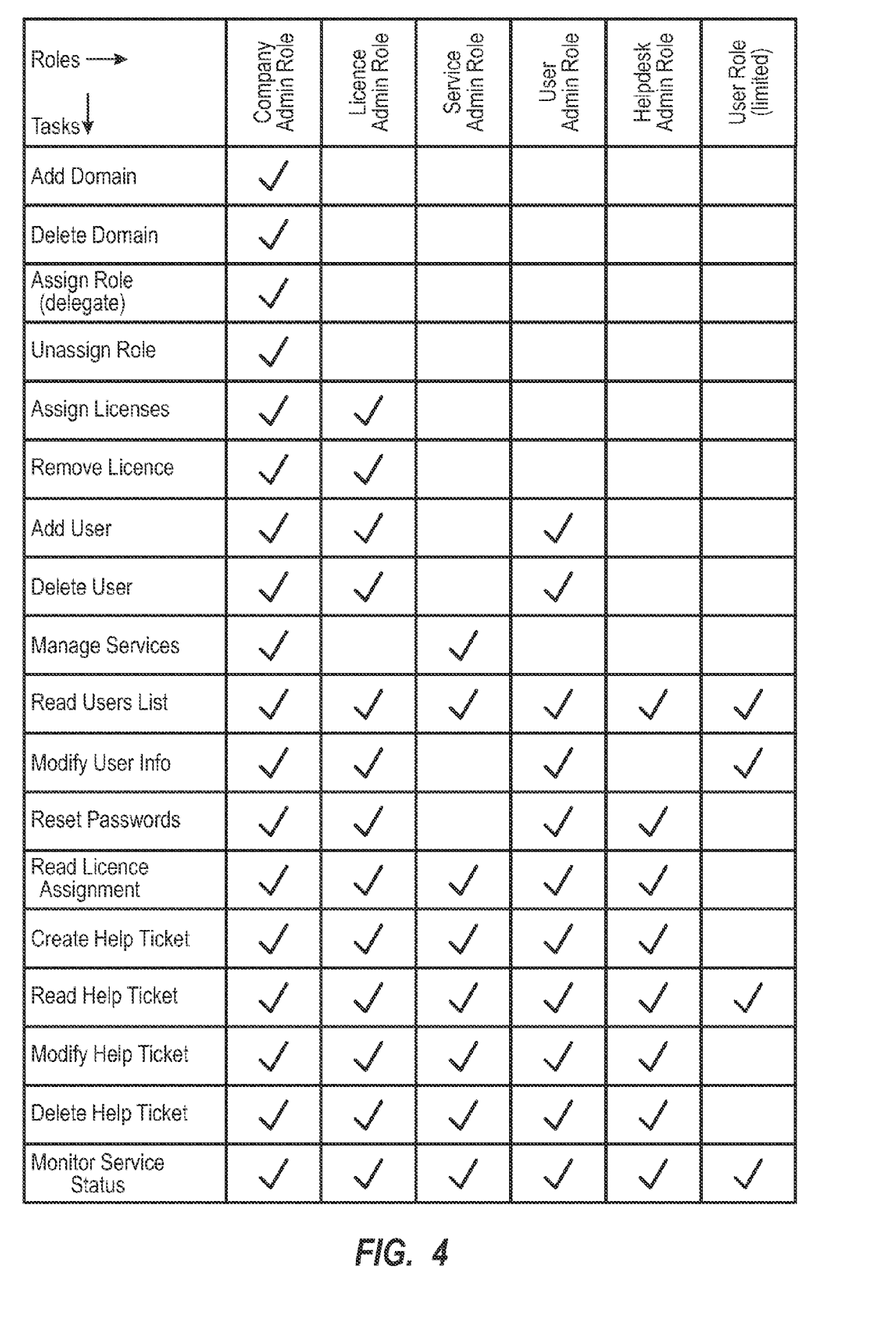
FIG. 4 illustrates a listing of administrative tasks that have been assigned to administrative roles in accordance with embodiments disclosed herein.

FIG. 4 shows several administrative tasks 315 that have been assigned to various administrative roles 325. As can be seen in FIG. 4, the company administrative role may include all of the administrative tasks. The license administrative role may include those administrative tasks 315 dealing with licensing issues. The service administrative role may include those administrative tasks 315 dealing with service issues. The user administrative role may include those administrative tasks 315 dealing with user administration. The helpdesk administrative role may include those administrative tasks 315 dealing with helpdesk issues. Finally, the user role may include those administrative tasks 315 dealing with user issues.

Returning to FIG. 3, the system 300 also includes target objects 340 that are to be subjected to the administrative tasks 315. The target objects may include all the users of a tenant and data that is associated with a tenant. For example, the objects 340 may include target objects 341 and 342 that correspond to the administrator 225, the user 226 or the individual users 227a, 227b and 227c that comprise the department 227. Alternatively, a target object 343 may correspond to the department 227. A target object 344 may correspond to data associated with the tenant such as data 272. This data may be a set of documents. It will be appreciated that numerous other target objects that are associated with a tenant may also exist.

As with the administrative tasks 315, the target objects 340 or a subset thereof may be assigned or mapped to an administrative role 325. The grouping of target objects is called scope. In one embodiment, the scope is set for all target objects associated with a tenant. In such embodiments, any administrative tasks assigned to an administrative role 325 may be performed on all the target objects.

However, in other embodiments the administrator may limit the scope for an administrative role 325. In such embodiments, a set 335 including one or more of the target objects 340 that are less than the full set of target objects may be assigned by the assign module 330 to an administrative role 325. In these embodiments, any administrative tasks assigned to an administrative role 325 may be performed only on the subset 335 of target objects that have also been assigned to the administrative role 325. Accordingly, the scope is set to the subset 335 of the target objects 340. For example, as shown in FIG. 3, the administrative role 325a has been assigned at set of target objects 335, which includes target objects 341 and 342.

In some embodiments, the configuration of an administrative role 325 with the set of administrative tasks 331 and set of target objects 335 may be performed in a data driven manner. Turning to FIG. 5, a simple XML schema 500 that defines various administrative roles 325 is illustrated. As shown, the XML schema 500 includes a company administrative role 510. Assigned to the company administrative role 510 are a number of administrative tasks 520. As can be seen, the administrative tasks 520 include the entire list of administrative tasks shown in FIG. 4. In addition, a scope 530 that includes all the target objects of the tenant is assigned to the company administrative role 510.

The XML schema 500 also includes a helpdesk administrative role 540. Assigned to the administrative role 540 are a number of administrative tasks 550. As can be seen, the administrative tasks 550 include only a subset of the list of administrative tasks shown in FIG. 4. The administrative tasks 550 are those administrative tasks that appropriate for a helpdesk role. It will be noted that some of the administrative tasks 550 are also included in the administrative tasks 520 as they are appropriate for both administrative roles. In addition, a scope 560 that includes all the target objects of the tenant is assigned to the helpdesk administrative role 540.

Finally, the XML schema 500 includes a user role 570 having administrative tasks 580 assigned to it. As shown, the administrative tasks 580 include a smaller subset of administrative tasks than subset 550 as there are fewer administrative tasks that are appropriate for the user role 570. It will be noted that some of the administrative tasks 580 are also included in the administrative tasks 520 and 550 as they are appropriate for all three administrative roles. In addition, a scope 590 that includes only the self user target object is assigned to the user role 570.

In some embodiments, the administrative roles 510, 540, and 570 are built-in or preconfigured at design time. Accordingly, the pre-configured roles and their associated administrative tasks are included in the XML schema 500.

An administrator of the tenant who desires to create new or custom administrative roles 325 may access the XML schema 500 using a user interface of system 300. The preconfigured administrative roles may then be copied as a customized role. This allows the administrator to modify the customized administrative roles 325. For example, the administrator may add administrative tasks to add or delete administrative tasks from the customized administrative roles as needed. In addition, the administrator may modify the scope of the customized administrative roles as needed. The system will then map the customized roles to the data in the XML schema 500 to create the customized roles.

Attention is once again made to FIG. 3, which illustrates a user module 350. As will be appreciated, it may be hard to manage the assignment of the administrative roles to individual users and groups of users. Accordingly, the user module 350 is configured to allow the administrator to associate specific users or groups of users of a tenant with various groups that will then be assigned to an administrative role 325.

In operation, the administrator specifies a group membership for the users of the tenant. For example, the administrator 225 may be included as part of an administration group. The user 226 and the department 227 or at least some of users of the department may be included as part of a helpdesk group. Alternatively, the department 227 may be included in the helpdesk group by itself and the user 226 may be part of a user group that only includes the user 226. It should be noted that a user may be part of more than one group. For instance, user 226 may be part of both the helpdesk group and a user group.

Once the group membership has been specified for the users of the tenant, the identity module 350 determines a user identity 355 for the group. The user identity 335 includes information that identifies or specifies the members of the group. For example, the user identity 355a may identify the helpdesk group while the user identify 335b may identify a user group.

The assignment module 330 may then associate the identity 355 with the administrative role 325 best suited for the group. For example, the identity 355a that identifies the helpdesk group will be associated with the helpdesk administrative role. In this way, the administrator is able to delegate the administrative roles along with the corresponding administrative tasks and target object to a subset of the users of the tenant or to a department of the tenant. That is, only those users who are part of the group identified by the identity 355 will be able to perform the administrative tasks assigned to an administrative role as will be explained in more detail to follow.

Figure 6:
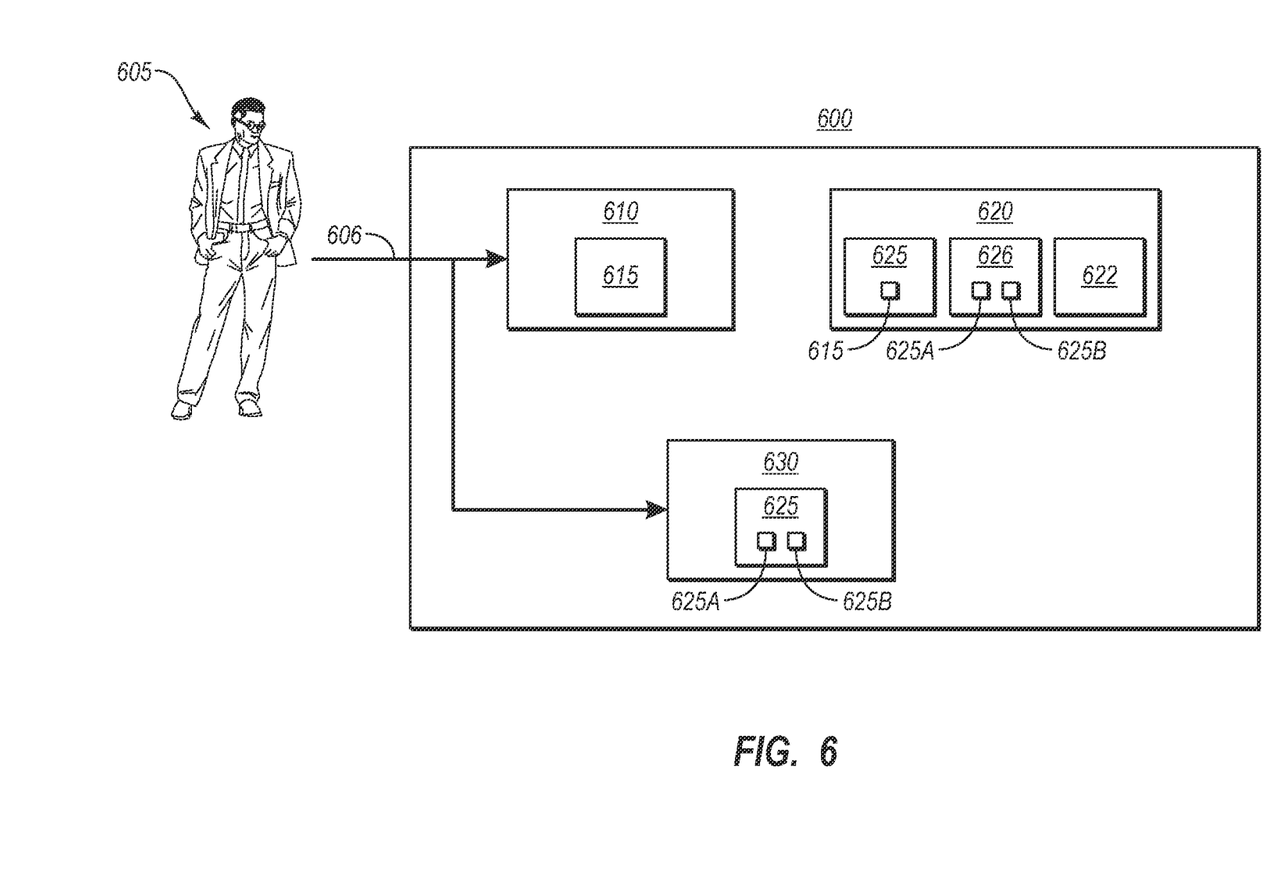
FIG. 6 illustrates an alternative portion of the multi-tenant computing system of FIG. 2 in which the embodiments disclosed herein may be performed.

Attention is now made to FIG. 6, which illustrates a system 600 of the management console 210 that is configured to allow a user of a tenant permission to perform one or more administrative tasks based on an administrative role. The system 600 may correspond to the administrative resources 278 previously described, although this is not required. It will be appreciated that although the system 600 is shown as comprising various modules, in some embodiments there may be more or less than the illustrated modules. In addition, although the modules are shown as being separate modules, in some embodiments the illustrated modules may be combined or may be part of another module. Further, the various modules of system 600 may include software, hardware, or any combination of software and hardware as circumstances warrant.

As illustrated, a tenant user 605 provides a request 606 for access to perform administrative tasks on resources of the tenant. The user 605 may be an individual user such as user 226 In addition, the user 605 may be part of a group such as a helpdesk group or an administrative group that has previously been established on the system.

The request 606 may contain information that identifies the user 605. For example, the information may include user name, group membership, department membership, or other information that would identify the user. The request 606 may also include the administrative tasks that the user 605 desires to perform and the target objects that are to be subjected to the administrative tasks.

The user request 606 is received by an identity module 610. The identity module 610 uses the identification information to establish an identity 615 of the user 605. As mentioned, the identify 615 may be based on a group membership that is already defined in the system as discussed above in relation to FIG. 3.

As illustrated, an administrative module 620 includes administrative roles 625, 626, and potentially any number of additional administrative roles as illustrated by ellipses 627. The administrative roles 625, 626, and potentially 627 have been assigned a set of administrative tasks, a set of target objects and are associated with a user identity as previously described. Accordingly, the administrative roles 625, 626, and potentially 627 may be used to delegate a subset of administrative tasks to a subset of users of a tenant.

The identify module 610 may then map the user 605 to one of the administrative roles 625, 626, or 627 based on the user identity 615. As shown, the administrative role 625 is associated with the identity 615. That is, the user 605 has been given permission to perform the administrative tasks assigned to administrative role 625 based on the user 605 being part of group associated with the identity 615. In some embodiments, however, the identify module may determine that none of the administrative roles 625, 626, or 627 are associated with the identity 615. In such embodiments, the system 600 will deny the user 605 access to perform administrative operations. However, the user 605 may still be able to perform non-administrave and self-role operations such as changing his or her password.

A permission module 630 then receives the administrative role 625 and the user request 606. The permission module 630 is configured to determine from the user request 606 which administrative tasks the user 605 desires to perform. The permission module 630 also determines if the desired administrative tasks are includes as part of the set of administrative tasks 625a of the administrative role 625. If the administrative tasks are included, then the permission module 630 grants the user 605 permission to perform the desired administrative tasks. However, if the administrative tasks are not included, then permission is denied.

The permission module is also configured to determine if the administrative tasks may be performed on the desired target objects. The permission module 630 determines if the desired target objects are includes as part of the set of target objects 625b of the administrative role 625. If the target objects are included, then the permission module 630 grants the user 605 permission to perform the desired administrative tasks on the desired target objects. However, if the target objects are not included, then permission is denied.

As mentioned above, in some embodiments the user 605 may belong to more that one group. Accordingly, the identity module may determine, based on the identity 615, that the user 605 also maps to the administrative role 626 that is associated with the second group that user 605 is part of. As with administrative module 626, the permission module 630 will then determine if the requested administrative tasks are included as part of the set of administrative tasks of administrative role 626, which may be different from the set 625a, and will allow permission to perform the administrative tasks if the administrative tasks are included. As well, the permission module 630 will determine if the requested target objects are included as part of the set of target objects of administrative role 626 and will allow permission to perform the administrative tasks on the target objects if the target objects are included. It should be noted that the task set of administrative role 626 and the task set 625a need not be completely different as both task sets may include several of the same tasks. Thus, if the user is not granted permission to perform a given administrative task as part of administrative role 625, he or she may still be given permission to perform the given administrative task as part of administrative role 626.

In some embodiments, an administrator may decide that it is no longer desirable for the user 605 to be assigned to an administrative role. Accordingly, the administrator may remove the user from the group associated with the identity 615. This will cause that the user 605 no longer maps to any of the administrative role 625, 626, or 627 and the system will deny permission to the user 605 to perform any administrative tasks.

Figure 7:
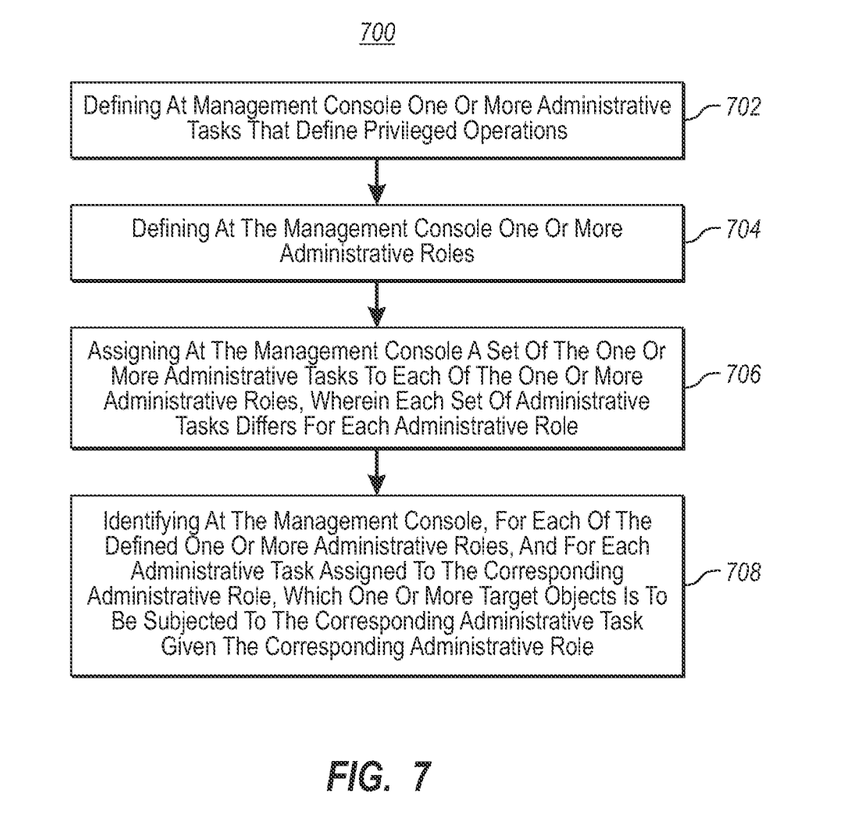
FIG. 7 illustrates a method for a computing system in a multi-tenant environment to allow a tenant administrator to define administrative roles in accordance with embodiments disclosed herein.

FIG. 7 illustrates a method 700 for a computing system in a multi-tenant environment to allow a tenant administrator to define administrative roles. Method 700 will be described with frequent reference to the computing systems of FIGS. 2 and 3. Note, however, that the computing systems of FIGS. 2 and 3 are only examples of numerous computing systems that may be employed to practice method 700.

Method 700 includes defining 702 at the management console one or more administrative tasks that define privileged operations. For example, the task module 310 may allow for the definition of administrative tasks 315. The administrative tasks 315 may include such privileged operations as those listed in FIG. 4, for example resetting a password or adding a user. In some embodiments, the administrative tasks may be defined at design time by a system designer and accessed by the administrator.

The method 700 also includes defining 704 at the management console one or more administrative roles and assigning 706 at the management console a set of the one or more administrative tasks to each of the administrative roles, where the set of administrative tasks differs for each administrative role. For example, the role module 320 may allow for the definition of administrative roles 325. The administrative roles may correspond to those listed in FIG. 4, for example a company administrative role, a license administrative role, a service administrative role, a user administrative role, a helpdesk administrative role, and a user role. In some embodiments, the administrator may define the administrative roles. In other embodiments, the system may come with preconfigured administrative roles that can be customized by the administrator.

Once defined, a set of the administrative tasks 315 are assigned to each administrative role. As previously described, the set of administrative tasks 331 assigned to a particular administrative role 325 will be those administrative tasks 315 that are appropriate for the administrative role. For example, those administrative tasks that are appropriate for a helpdesk administrative role will be assigned to that administrative role. Since some administrative tasks 315 may be appropriate for more than one administrative role 325, such administrative tasks may be assigned to multiple administrative roles 325 as needed.

The method 700 further includes identifying 708 at the management console, for each of the defined one or more administrative roles, and for each administrative task assigned to the corresponding administrative role, which one or more target objects is to be subjected to the corresponding administrative task given the corresponding administrative role. For example, the administrator may identify the target objects 340, which may include all the users of a tenant and data that is associated with a tenant. For example, the targets objects 340 may include target objects 341 and 342 that correspond to the administrator 225, the user 226 or the individual users 227a, 227b and 227c that comprise the department 227. Alternatively, a target object 343 may correspond to the department 227. A target object 344 may correspond to data associated with the tenant such as data 272. This data may be a set of documents. It will be appreciated that numerous other target objects that are associated with a tenant may also exist.

Once identified, a set 335 of the target objects may be assigned to the administrative role 325. The set 335 may include all the target objects associated with a tenant. In such embodiments, the administrative tasks associated with the administrative role may be performed on all target objects of the tenant. Alternatively, the set 335 may include one or more of the target objects 340 that are less than the full set of target objects. In these embodiments, any administrative tasks assigned to an administrative role 325 may be performed only on the subset 335 of target objects that have also been assigned to the administrative role 325.

As previously described in relation to FIG. 5, in some embodiments, the configuration of an administrative role 325 with the set of administrative tasks 331 and set of target objects 335 may be performed in a data driven manner. That is, the XML schema 500 is used to pre-configure administrative roles, which the administrator may use. However, as described above, the administrator may access the XML scheme with a user interface of system 300 to configure new or customized administrative roles, which are mapped by the system to the XML files. This allows the administrator to add, remove or modify the administrative tasks 315 and/or the target objects 340 that are associated with an administrative role 325 as previously explained.

Figure 8:
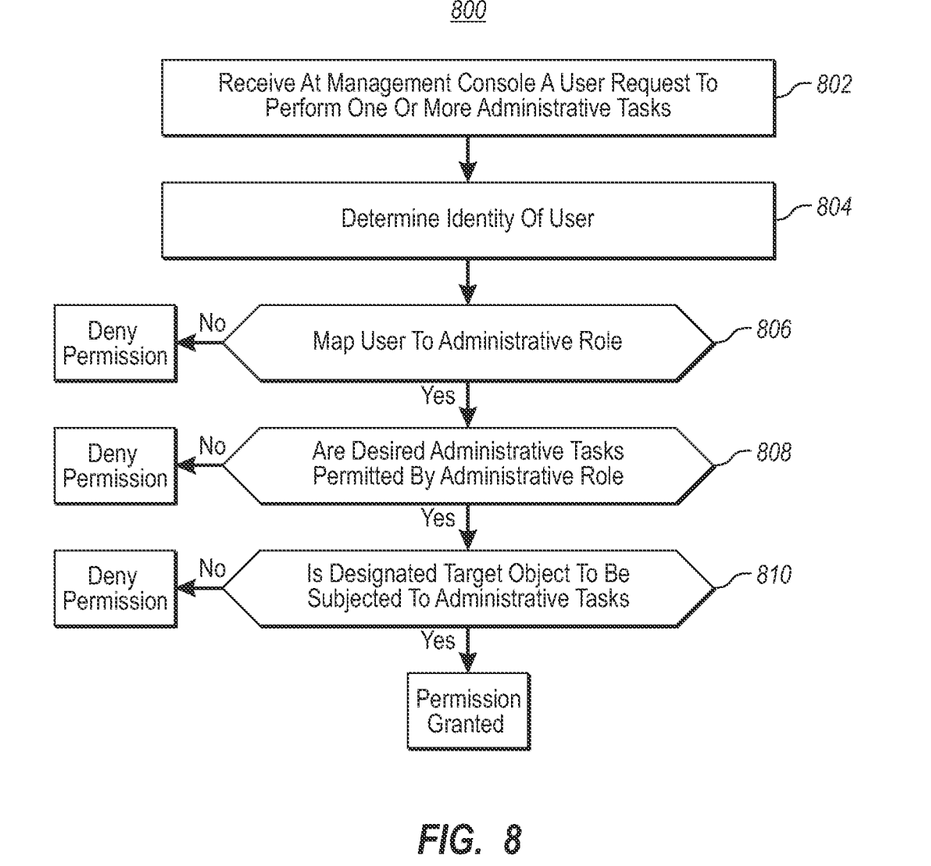
FIG. 8 illustrates a method for a user associated with a tenant to obtain permission to perform one or more administrative tasks in accordance with embodiments disclosed herein.

Turning now to FIG. 8, a method 800 for a user associated with a tenant to obtain permission to perform one or more administrative tasks is illustrated. Method 800 will be described with frequent reference to the computing systems of FIGS. 2, 3, and 6. Note, however, that the computing systems of FIGS. 2, 3, and 6 are only one of numerous computing systems that may be employed to practice method 800.

Method 800 includes receiving 802 at the management console a user request to perform one or more administrative tasks, where the administrative task define privileged operations. For example, the identity module 610 may receive the user input 606 from the tenant user 605. The user request 606 may specify what administrative tasks 315 the user 606 desires to perform.

Method 800 also includes determining 804 at the management console an identity of the user. For example, the user request 606 may include information that allows identity module to determine an identity 615 of the user as described. The identify 615 may be based on a group membership that is already defined in the system as discussed above in relation to FIG. 3.

Method 800 further includes mapping 806 at the management console the user to an administrative role based on the identity, wherein the administrative role defines a set of administrative tasks that the user is allowed to perform and a set of target objects on which the administrative tasks may be performed. For example, the identify module 610 may map the user 605 to one of the administrative roles 625, 626, or 627 based on the user identity 615 (yes in decision block 806). That is, the user 605 has been given permission to perform the administrative tasks assigned to an administrative role based on the user 605 being part of group associated with the identity 615.

In some embodiments, however, the identify module may determine that no administrative roles are associated with the identity 615 (no in decision block 806). In such embodiments, the system 600 will deny permission to the user 605 to perform administrative operations. As previously discussed, the user 605 may still be able to perform non-administrative and self operations.

Method 800 also includes determining 808 at the management console if the one or more administrative tasks the user desires to perform is permitted by the administrative role. For example, the permission module 630 may determine if the administrative tasks specified in the user request 606 are assigned to administrative role 625. If not (no in decision block 808), permission to perform the administrative tasks is denied. If the administrative tasks are assigned to the administrative role (yes in decision block 808), then the permission to perform the administrative tasks is granted.

Method 800 further includes determining 810 at the management console if a designated target object is to be subjected to the desired one or more administrative tasks. For example, the permission module 630 may determine if the target objects specified by the user request 606 are allowed by the administrative role. If not (no in decision block 810), permission to perform the administrative tasks on the target objects is denied. If the target objects are allowed by the administrative role (yes in decision block 810), then the permission to perform the administrative tasks on the target objects is granted.

In some embodiments, the user identity may be associated with more than one administrative role. As described previously, in such embodiments the identity module 610 may map the user 605 to additional administrative roles. The permission module will then determine if the additional administrative roles allow the user 605 to perform the desired administrative tasks on the desired target objects. In some embodiments, an administrator may decide that it is no longer desirable for the user 605 to be assigned to an administrative role. Accordingly, the administrator may remove the user from the group associated with the identity 615, This will cause that the user 605 no longer maps to any of the administrative role 625, 626, or 627 and the system will deny permission to the user 605 to perform any administrative tasks.

Figure 9:
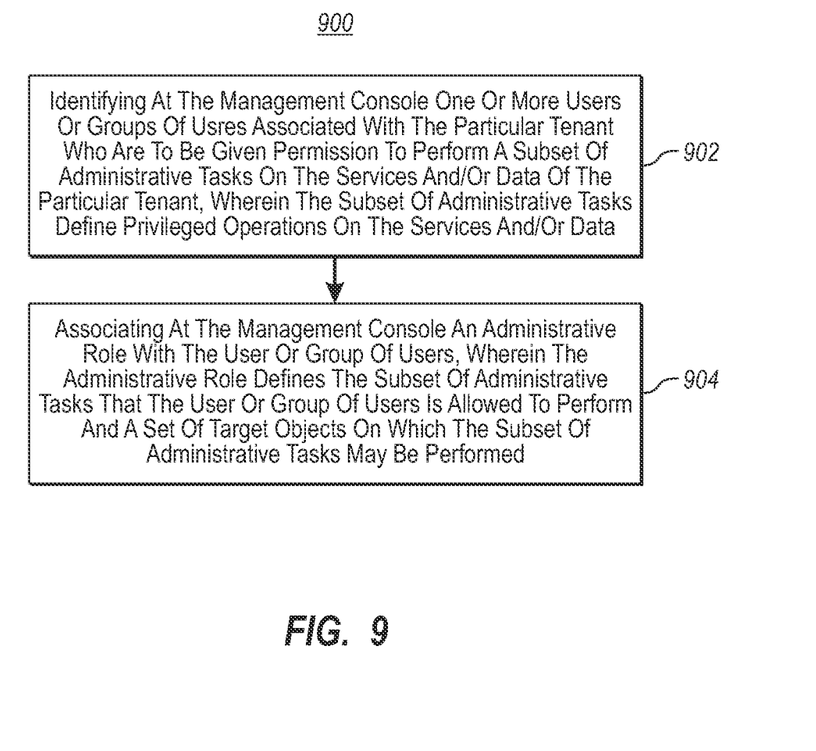
FIG. 9 illustrates a method for a particular tenant administrator to delegate administrative tasks to other users associated with the particular tenant in accordance with embodiments disclosed herein.

FIG. 9 illustrates a method 900 for a particular tenant administrator to delegate administrative tasks to other users associated with the particular tenant. Method 900 will be described with frequent reference to the computing systems of FIGS. 2, 3, and 6. Note, however, that the computing systems of FIGS. 2, 3, and 6 are only one of numerous computing systems that may be employed to practice method 900.

Method 900 includes identifying 902 at the management console one or more users or groups of users associated with the particular tenant who are to be given permission to perform a subset of administrative tasks on the services and/or data of the particular tenant, wherein the subset of administrative tasks define privileged operations on the services and/or data. For example, the identity module 610 may identify the user 605, who may be an individual user or a group of users as previously described. The user 605 may provide a user request 606 that specifies administrative tasks that the user desires to perform.

The method 900 also includes associating 904 at the management console an administrative role with the user or group of users, wherein the administrative role defines the subset of administrative tasks that the user or group of users is allowed to perform and a set of target objects on which the subset of administrative tasks may be performed. For example, the identity module may determine an identity 615 of the user 605 based on the user's group identity. This identity may be mapped to an administrative role 620 that is associated with a group identity as described above in relation to FIG. 3. The user 605 will be given permission to perform those administrative tasks that are associated with the administrative role. In addition, the user will be given permission to perform the administrative tasks on the target objects associated with the administrative role Although methods have been described with respect to FIGS. 7-9, the embodiments disclosed herein may extend to computer program products comprising one or more computer-readable media having thereon one or more computer-executable instructions that, when executed by one or more processors of the server computing system, cause the computing system to perform all or portions or either of these methods. For instance, referring to FIG. 1, memory 104 and communication channels 108 may represent examples of such computer-readable media. The memory 104 represents an example of physical computer-readable media in the form of physical storage and/or memory media. The embodiments disclosed herein also extend to computing systems themselves that are configured through hardware, software, or a combination of hardware and software, to perform all of portions of the methods of FIGS. 7-9.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a multi-tenant environment including two or more tenants, wherein a management console provides administration services for each tenant and also stores data for each tenant, the data being stored in a manner that is secure to the tenant that owns the data, a method for defining administrative roles that specify administrative tasks that can be performed on the resources and data belonging to a tenant so that an administrator of the tenant may delegate a subset of the administrative tasks to a user associated with the tenant, the method comprising:

identifying at the management console a plurality of administrative tasks that define privileged operations that an administrator of a tenant is authorized to perform on objects of the tenant;

defining at the management console one or more administrative roles, by:
 (1) assigning at the management console a subset of the plurality of administrative tasks to each of the one or more administrative roles, wherein each subset of administrative tasks comprises less than all of the plurality of administrative tasks and each subset differs for each administrative role; and
 (2) assigning at the management console, for each of the defined one or more administrative roles, and for each administrative task assigned to the corresponding administrative role, which one or more target objects is to be subjected to the corresponding administrative task given the corresponding administrative role; and assigning at the management console one or more users or groups of users to each of the at least one of the one or more administrative roles to thereby authorize the one or more users or groups of users assigned to each of the at least one of the one or more administrative roles to perform the one or more administrative tasks on the one or more target objects assigned to the corresponding administrative role to thereby enable an administrator of the tenant to delegate a subset of the plurality of administrative tasks to a user or group of users of the tenant.

2. The method in accordance with claim 1, wherein the plurality of administrative tasks comprises at least three of:
 an add domain task,
 a delete domain task,
 an assign role task,
 an unassigned role task,
 an assign license task,
 a remove license task,
 an add user task,
 a delete user task,
 a manage services task,
 a read users list task,
 a modify user information task,
 a reset password task,
 a read license agreement task,
 a create help ticket task,
 a read help ticket task,
 a modify help ticket task,
 a delete help ticket task, and
 a monitor service status task.

3. The method in accordance with claim 1, further comprising:
 modifying at the management console the subset of administrative tasks that is assigned to an administrative role.

4. The method in accordance with claim 3, wherein modifying the subset of administrative tasks includes one of adding an administrative task or deleting an administrative task.

5. The method in accordance with claim 1, further comprising:
 modifying at the management console the one or more target objects assigned to an administrative role.

6. The method in accordance with claim 1, wherein the one or more target objects are one of a set of users associated with the particular tenant or a set of documents associated with the particular tenant.

7. The method in accordance with claim 6, wherein the set of users is a department of the particular tenant.

8. The method in accordance with claim 1, wherein the administrative roles include a company administrative role, a license administrative role, a service administrative role, a user administrative role, a helpdesk administrative role, and a user administrative role.

9. The method in accordance with claim 1, wherein the target objects include all target objects associated with the particular tenant.

10. In a multi-tenant environment including two or more tenants, wherein a management console provides administration services for each tenant and also stores data for each tenant, the data being stored in a manner that is secure to the tenant that owns the data, a method for a user associated with a tenant to obtain permission to perform one or more administrative tasks that have been delegated to the user, the method comprising:
    receiving at the management console a user request for access to perform one or more administrative tasks on a designated target object, wherein the administrative tasks define privileged operations;
    determining at the management console an identity of the user;
    mapping at the management console the user to an administrative role based on the identity, wherein the administrative role defines a subset of administrative tasks that the user is allowed to perform and a set of target objects on which each administrative task of the subset of administrative tasks may be performed, wherein the subset of administrative tasks assigned to the administrative role are defined by an administrator of the tenant to delegate the authorization to perform the subset of administrative tasks on the set of target objects to the user without having to delegate the authorization to perform all of the administrative tasks on the set of target objects;
    wherein each administrative role includes an element for each of the administrative tasks associated with the administrative role, and an element for each of the target objects in the set of target objects on which the subset of administrative tasks may be performed;
    determining at the management console that the one or more administrative tasks the user desires to perform is permitted by the administrative role based on the mapping; and
    determining at the management console that the designated target object is permitted by the administrative role to be subjected to the desired one or more administrative tasks.

11. The method in accordance with claim 10, wherein the user identity is a group identity that is used by more than one user.

12. The method in accordance with claim 10, wherein the administrative role is a first administrative role, the subset of administrative tasks is a first subset of administrative tasks and the set of target objects is a first set of target objects, the method further comprising:
    mapping at the management console the user to a second administrative role based on the identity, wherein the second administrative role defines a second subset of administrative tasks that the user is allowed to perform and a second set of target objects on which each administrative task of the second subset of administrative tasks may be performed, wherein the second subset of administrative tasks assigned to the second administrative role are defined by the administrator of the tenant to delegate the authorization to perform the second subset of administrative tasks on the second set of target objects to the user without having to delegate the authorization to perform all of the administrative tasks on the second set of target objects.

13. The method in accordance with claim 12, further comprising:
    determining at the management console that the one or more administrative tasks the user desires to perform is permitted by the second administrative role; and
    determining at the management console that a designated target object is permitted by the second administrative role.

14. The method in accordance with claim 10, wherein the user comprises a group of multiple users that are associated with the tenant.

15. The method in accordance with claim 10, further comprising:
    removing at the management console the mapping of the identity to the administrative role such that the user no longer has permission to perform the subset of administrative tasks.

16. The method in accordance with claim 10, wherein the designated target object is one of a set of people associated with the particular tenant or a set of documents associated with the particular tenant.

17. In a multi-tenant environment including two or more tenants, wherein a management console provides administration services for each tenant and also stores data for each tenant, the data being stored in a manner that is secure to the tenant that owns the data, a method for a particular tenant administrator to delegate administrative tasks to other users associated with the particular tenant, the method comprising:
    identifying at the management console one or more users or groups of users associated with the particular tenant who are to be given permission to perform a subset of administrative tasks on the services and/or data of the particular tenant, wherein the subset of administrative tasks define privileged operations on the services and/or data and comprises less than all of the administrative tasks that the administrator is authorized to perform on the services and/or data of the particular tenant; and
    associating at the management console an administrative role with the user or group of users, wherein the administrative role defines the subset of administrative tasks that the user or group of users is allowed to perform and a set of target objects of the tenant on which the subset of administrative tasks may be performed thereby enabling the administrator of the tenant to delegate the subset of administrative tasks to the user or group of users of the tenant without having to authorize the user or group of users to perform all of the administrative tasks on the set of target objects of the tenant,
    wherein the administrative role is defined with element for each of the administrative tasks associated with the administrative role, and an element for each of the target objects in the set of target objects on which the subset of administrative tasks may be performed.

18. The method in accordance with claim 17, wherein the set of target objects are one of a set of people associated with the particular tenant or a set of documents associated with the particular tenant.

19. The method in accordance with claim 17, further comprising:
- determining at the management console that the subset of administrative tasks the user or groups of users is to be given permission to perform is permitted by the administrative role; and
- determining at the management console that a designated target object is permitted by the administrative role.

20. The method in accordance with claim 17, wherein the administrative roles include a company administrative role, a license administrative role, a service administrative role, a user administrative role, a helpdesk administrative role, and a user administrative role.

* * * * *